Patented Feb. 25, 1930

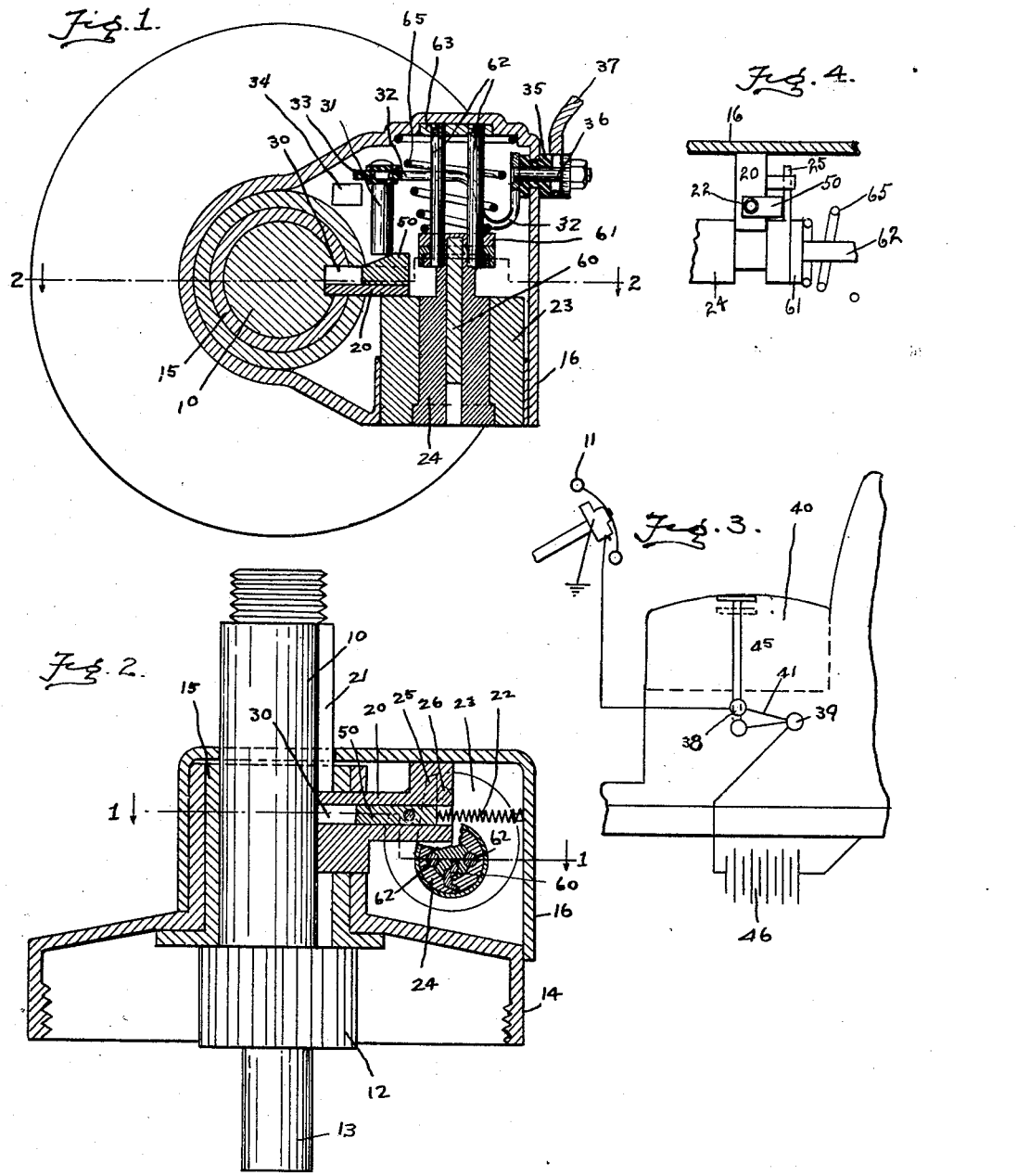

1,748,350

UNITED STATES PATENT OFFICE

GEORGE JACOBS, OF DETROIT, AND BENJAMIN H. KAUFMANN, OF HIGHLAND PARK, MICHIGAN

AUTOMOBILE LOCK

Application filed June 29, 1925. Serial No. 40,418.

The present invention relates to motor vehicle locks and especially to locks which are automatically operative to lock the car without their positive actuation by the driver.

Among the objects of the invention is a lock for one of the devices used in controlling a car which lock is inoperative so long as the driver remains in his seat but becomes operative upon his leaving his seat.

Another object is a lock of the type mentioned which has a delayed action.

Other objects will readily appear to those skilled in the art by reference to the following description and drawings, in which similar reference numerals refer to like parts throughout the several figures of the drawings, and in which:

Fig. 1 is a horizontal section of the lock taken on line 1—1 of Fig. 2.

Fig. 2 is a vertical section of the lock on line 2—2 of Fig. 1.

Fig. 3 is a diagrammatic view of an automobile seat and steering wheel showing the electric connections.

Fig. 4 is a partial view from the right of Fig. 2 showing the relation of the locking bolt and cylinder.

In the drawings, the device is illustrated as operating in connection with the steering wheel and head of a "Ford" automobile, although it can without material change be adapted to operate in connection with other control elements of this make of automobile or any other make.

As illustrated, 10 indicates the shaft upon which is mounted the steering wheel 11, shaft 10, in the form shown, operating, through reduction gearing 12, the steering shaft 13. The reduction gearing 12 is enclosed in a housing 14 carrying bushing 15 for shaft 10, and over housing 14 is secured a second housing 16 for the locking mechanism.

The locking mechanism proper consists of a bolt 20 adapted to slide through registering slots in housing 14 and bushing 15 into a longitudinal slot 21 in shaft 10, thus locking the shaft 10 from turning and therefore preventing steering of the automobile. The bolt 20 is spring pressed to locking position by means of spring 22 and therefore tends at all times to assume this position.

Also in housing 16 is fixed a lock barrel 23, preferably of the cylinder type. This barrel 23 contains an inner cylinder 24 provided with the usual tumblers adapted to be operated by a key so as to release the cylinder 24 and allow the latter to be rotated, and fixed to cylinder 24 is a finger 25 operating against pin 26 on the bolt to retract the latter against spring 22 and out of slot 21, thus permitting shaft 10 to be rotated. When the bolt has been retracted as described, it is retained in this position by the following means.

The bolt 20 is provided near its forward end with a slot 30 into which, when the bolt is retracted, is adapted to drop a pin or bolt 31 carried on a spring arm 32, the spring arm tending normally to cause engagement of pin 31 and the slot. Therefore, when the cylinder 24 is rotated to retract the bolt 20, the latter is retained in unlocked position until the pin 31 is lifted from the slot.

It should be noted that the spring arm 32 is made of what is known as bi-metal, that is, it is composed of two metals of unequal expansion characteristics and adapted to bend upon change of temperature, and the slot 30 and spring arm 32 are so proportioned and adjusted that, when the latter is heated to a selected temperature, the pin 31 is lifted just out of the slot.

When the pin 31 drops into slot 30, the end 33 of the spring arm 32, makes a contact with the contact member 34 upon housing 16 while the other or fixed end of arm 32 is insulated from the housing 16 as shown, the insulating means being, for example, a fibre bushing 35 surrounding the bolt 36 which secures arm 32 to the housing and to the outer end of which is secured a lead wire 37.

Lead wire 37 is connected with one point 38 of a switch 39 so located with respect to the driver's seat 40 and so connected thereto, that when the driver is in position to drive, the switch is open and the arm 41 thereof is off of contact 38. There are a number of ways by which this operation may be secured and one way is illustrated in Fig. 3. In this figure, a rod 45 is shown as extending from the upper surface of cushion 40 to the switch arm so that depression of the cushion opens the switch.

This switch 39 is adapted to complete a circuit from one pole of a battery 46 through lead 37, arm 32, contact 34, and to ground, while the other pole of the battery is also grounded.

When, therefore, the bolt 20 is being held in retracted position by the pin 31 in slot 30, and the driver leaves his position, the circuit mentioned is completed by the closing of the switch 39. The passage of current then heats the spring arm 32 which bends under the heating and draws the pin 31 from the slot 30, allowing the bolt 20 to be spring pressed to locking position.

It is preferred to use this heating of arm 32 and the consequent lag in operation over a magnetic or other instantaneously operating device as it may be adjusted to operate with a lag of any suitable duration. If an instantaneous device is used, the jolting of rough roads might be sufficient to bounce the driver sufficiently high to close the circuit with consequent locking of the control element,—a result that might cause fatal loss of control of the car. A lag of several seconds is sufficient to obviate this difficulty.

In order to prevent burning the contact parts 33 and 34, a quick break means is included in the device shown. This quick break means consists of a hardened cam piece 50 set into bolt 20 and so formed that when the pin 31 is lifted out of slot 30 and the bolt 20 is moved toward the shaft 10, the pin 31 is quickly thrust outwardly by the cam piece 50 and the contact between 33 and 34 as quickly broken. This breaking of the circuit also allows arm 32 to cool and become set for the next operation as a spring arm.

Another feature of the present device is means by which it becomes impossible for the operator to leave his key in the lock and thus render the device ineffective.

This means consists of a plunger 60 entering the rear of cylinder 24 and secured to disc 61 slidably mounted upon two guide rods 62 secured in the rear end of cylinder 24. At their other ends these rods 62 are secured in a disc 63 rotatably mounted in a wall of housing 16. The disc 61 is pressed toward the cylinder 24 by a spiral spring 65 acting against disc 61 and a wall of housing 16. This spring is also secured from turning on either the disc 61 or the wall and thus serves two purposes. It serves to operate the plunger 60 and also serves to return the cylinder 24 to rest position. When the key is inserted in the cylinder, it pushes back the plunger. The cylinder is then rotated to retract bolt 20. After these operations have been completed, the spring 65 will first return the cylinder 24 to rest position and then eject the key.

Having now described the invention and the preferred form of embodiment thereof, it is to be understood that said invention is not to be limited to the precise details described and shown but only by the scope of the claims which follow.

We claim:—

1. A locking device for a control element of an automobile comprising a bolt adapted to lock said element, key operated means to retract said bolt to unlocked position, means to retain said bolt in the latter position and means to release said retaining means, said releasing means being adapted to be put into operation by the act of the driver moving from driving position.

2. A locking device for a control element of an automobile comprising means for rendering said element inoperable, said means being adapted to be key operated to unlocked condition, means for maintaining the first mentioned means in unlocked condition, and heat controlled means for releasing said maintaining means.

3. A locking device for a control element of an automobile comprising means for rendering said element inoperable, said means being adapted to be key operated to unlocked condition, means for maintaining the first mentioned means in unlocked condition, and thermo-electric controlled means for releasing said maintaining means.

4. A locking device for automobiles comprising a slotted control element for the automobile, a spring actuated bolt adapted to enter said slot to prevent operation of the element, the bolt being itself slotted, a pin adapted to enter the slot in said bolt to prevent said bolt entering said slotted element, and automatic means adapted to withdraw said pin from said bolt.

5. A locking device for automobiles comprising a slotted control element for the automobile, a spring actuated bolt adapted to enter said slot to prevent operation of the element, the bolt being itself slotted, a pin adapted to enter the slot in said bolt to prevent said bolt locking said element, and means adapted to withdraw said pin from said bolt, said means comprising a bi-metallic strip carrying said pin and means for heating said strip.

6. A locking device for automobiles comprising a slotted control element for the automobile, a spring actuated bolt adapted to enter said slot to prevent operation of the element, the bolt being itself slotted, a pin adapted to enter the slot in said bolt to prevent said bolt locking said element, and means adapted to withdraw said pin from said bolt, said means comprising a bi-metallic strip carrying said pin and means whereby an electric current may be passed through said strip to heat the same and thereby distort it sufficiently to withdraw the pin.

7. In a locking device for a control element of an automobile, heat responsive means for maintaining said device in unlocked condition, electric heating means for said heat responsive means, and a switch for controlling the electric means operable to close the circuit upon the vacation of the driver's seat of the automobile.

GEORGE JACOBS.
BENJAMIN H. KAUFMANN.